US006779722B1

(12) United States Patent  
Mason

(10) Patent No.: US 6,779,722 B1  
(45) Date of Patent: Aug. 24, 2004

(54) SYSTEM AND METHOD FOR UPDATING A DATABASE OF WEIGHTS AT A SELF-CHECKOUT TERMINAL

(75) Inventor: Timothy E. Mason, Buford, GA (US)

(73) Assignee: NCR Corporation, Dayton, OH (US)

(*) Notice: Subject to any disclaimer, the term of this patent is extended or adjusted under 35 U.S.C. 154(b) by 83 days.

(21) Appl. No.: 10/185,325

(22) Filed: Jun. 28, 2002

(51) Int. Cl.[7] .......................... G06K 15/00; G06F 17/00
(52) U.S. Cl. ...................................... 235/383; 235/375
(58) Field of Search ................................ 235/375, 383; 705/16, 18, 64

(56) References Cited

U.S. PATENT DOCUMENTS

| | | | | |
|---|---|---|---|---|
| 4,676,343 A | * | 6/1987 | Humble et al. .............. 186/61 |
| 6,047,262 A | | 4/2000 | Lutz ............................ 705/16 |
| 6,105,866 A | | 8/2000 | Morrison et al. ........... 235/383 |
| 6,215,078 B1 | * | 4/2001 | Torres et al. ............. 177/25.15 |
| 6,354,496 B1 | * | 3/2002 | Murphy et al. ............. 235/383 |
| 6,431,444 B1 | * | 8/2002 | Gatto ........................... 235/380 |
| 6,522,772 B1 | * | 2/2003 | Morrison et al. ............ 382/124 |
| 6,598,791 B2 | * | 7/2003 | Bellis et al. ................ 235/383 |
| 2003/0024982 A1 | * | 2/2003 | Bellis et al. ................ 235/383 |

* cited by examiner

Primary Examiner—Thien M. Le  
Assistant Examiner—April Taylor  
(74) Attorney, Agent, or Firm—Maginot Moore & Beck LLP

(57) ABSTRACT

A system facilitates the collection of reliable data for computing a new weight associated with an item identifier in a database for operating self-checkout stations in a store. The system includes an authorized personnel identifier for identifying authorized personnel scanning an item and a provisional weight multiplier operatively coupled to the authorized personnel identifier for multiplying a contribution of a sensed weight for the scanned item to a new weight computation for the scanned item. The system preferably counts a measured weight for an item scanned by a store attendant as two or three measurements in collecting the number of weight readings required for establishing a new weight for an item identifier. Thus, the system utilizes the more trustworthy data obtained by a store employee to confirm a new data value without significantly jeopardizing the integrity of the new data value computation.

22 Claims, 3 Drawing Sheets

SYSTEM AND METHOD FOR UPDATING A DATABASE OF WEIGHTS AT A SELF-CHECKOUT TERMINAL

FIELD OF THE INVENTION

This invention relates generally to methods and systems for facilitating transactions at a self-checkout terminal and more particularly, to methods and systems for facilitating transaction at self-checkout terminals with a scale.

BACKGROUND OF THE INVENTION

Self-checkout terminals at grocery stores and other retail stores are well known. The terminals permit a consumer to present items for purchase to sensors at the terminal so the terminal can identify the items and a corresponding price. When the consumer indicates all items for purchase have been presented to the terminal, a sub-total is accumulated, any taxes and discounts are computed, and a total amount due is displayed for the consumer. The terminal then allows the consumer to select a payment method. The terminal presents menu selections to the consumer so funds are transferred to the retailer's account. Upon confirmation of payment, the items are released to the consumer.

A self-checkout terminal typically includes a display, a scanner for reading unit price codes (UPC), and a checkout area for holding items once they have been scanned. The checkout area may include a motor driven belt to carry items for which a purchase has been verified to a collection area. The terminal also includes a processor, memory, programmed instructions, and data peripherals to control the operations of the terminal. The programmed instructions may contain modules for querying for item prices, computing totals and performing other functions related to the purchase of items through a self-checkout terminal. Some checkout terminals may also include a security application program that operates to reduce the likelihood that the consumer leaves without scanning all of the items or exchanges scanned items with more expensive items that have not been scanned. In many self-checkout terminals, the surface area of the checkout area or belt has a scale underneath it to help track items during checkout. By monitoring the weight of items placed on the checkout area, the security application is able to determine some actions of the consumer for purposes of detecting fraud or operator error by a consumer. For example, the change in weight detected by the scales of the checkout area may be used to determine the weight of an item just placed on the checkout area. This item weight may then be compared to the weight of the item last scanned that is stored in a database or other memory. If the weights are different, the security application program notifies the consumer and prompts the consumer to remove the item and scan the item again to rectify the discrepancy. Thus, the application program is capable of tracking the scanning of items and their placement on the checkout area through its monitoring of the scales associated with the checkout area.

The database for items that may be sold in a store is typically organized by item identifiers such as a UPC. Data that may be stored in association with an item identifier includes its price and its weight although other data may also be stored with the identifier. The weight may be a value that is entered at the time that the item identifier is entered in the database. Alternatively, the weight may be a statistical average of weights that have been sensed for an item identifier scanned at a self-checkout station. Such a statistical average may be used to modify a weight stored in a database. Modification based on historical data may be used to adjust a database when a manufacturer alters packaging of an item for a promotional event. For example, a detergent manufacturer may increase the size of its packaging to provide an additional 8 ounces of detergent for the same price as its standard size. The promotional sized packages weigh more than the standard sized packages and the security application would at determine that the promotional packages did not conform to the weight data stored in the database for the item identifier until the data in the database was updated to reflect the promotional package parameters. To avoid the necessity of manually updating the database for such promotional items, the security application may require a consumer to rescan the item to confirm the measured weight for the item and then approve the item for purchase. In other known self-checkout stations, the terminal display may display an error message informing the consumer of the detected weight discrepancy so appropriate action may be taken such as rescanning and weighing the item or having a self-checkout attendant approve the sale. Once the weight is confirmed, the security application may then store a count of weights measured within some narrow range about the newly confirmed weight for the item identifier. When the counter reaches some threshold value, the security application may then update the stored weight for the item identifier with statistical average of the measured values such as the mean or median of the historical weights. In this manner, the weight for an item identifier is confirmed by multiple cycles of consumer rescanning and weighing of the item before permitting the weight stored in the database to be modified or added to the list of approved weights stored for an item identifier.

While this type of database updating reduces the likelihood of loses from fraudulent activity during self-checkout, it does have some drawbacks. For one, consumers are required to rescan items for weighing until the threshold count is reached and the new weight for the item identifier is verified by an adequate history of measured weights. Any time that consumers are required to rescan items there is delay and an opportunity for the introduction of additional errors in the checkout process. In some cases, the checkout process may be adversely impacted to the point that intervention by a cashier or other self-checkout station attendant may be required. Regardless of the manner in which the weight verification occurs, the procedures for such verification are time-consuming and degrade the efficiency of the self-checkout process.

What is needed is a system and method of updating the stored weight data for item identifiers that facilitates the historical analysis of the accurate weight for an item identifier.

What is needed is a system and method for collecting historical weight data for scanned items at a self-checkout station that reduces the necessity of rescanning items or attendant intervention to verify the weight of an item.

SUMMARY OF THE INVENTION

The above-noted limitations of previously known systems and methods for determining weights for items in the checkout area of a self-checkout terminal have been overcome by a system and method that operate in accordance with the principles of the present invention. The system of the present invention comprises an authorized personnel identifier for identifying authorized personnel scanning an item and a provisional weight multiplier operatively coupled to the authorized personnel identifier for multiplying a contribution of a sensed weight for the scanned item to a new weight computation for the scanned item. The system of the present invention preferably counts a measured weight for an item scanned by a store attendant as two or three measurements in computing the total required reaching the threshold for establishing a new data value. Thus, the system utilizes the more trustworthy data obtained by a store employee to confirm a new data value without significantly jeopardizing the integrity of the new data value computation.

In one embodiment of the present invention, authorized personnel of a store carry identification tokens that bear indicia that may be scanned by the scanner of a self-checkout station. When one of the authorized personnel are going to intervene in a transaction at a self-checkout station, he or she scans his or her identification token at the scanner. The identification code may then be used to retrieve data from the database that indicates an authorized person is now operating the self-checkout station. The weight that resulted in the notification of a weight discrepancy may then be evaluated. If the sensed weight corresponds to a provisional weight stored for the item identifier, a counter for the existing provisional weight may be incremented by a value greater than one. Alternatively, multiple copies of the measured weight may be stored in a histogram associated with the existing provisional weight. If the measured weight does not correspond to an existing provisional or approved weight then a provisional weight for the item identifier is generated. The initial value of the counter for the generated provisional weight may be initialized at a value greater than one or, alternatively, multiple copies of the measured weight may be stored in a histogram for the generated provisional weight. As subsequent items are scanned and the scale of the station verifies their weights, the provisional weight multiplier may store multiple copies of the measured weight data in the database or it may increase the count for a provisional weight by more than one. In one embodiment of the present invention, the provisional weight multiplier only uses the data of the next scanned item in such a preferential manner before returning to the consumer operated mode. In another embodiment, the provisional weight multiplier continues to give increased significance to the data of items scanned at the scanner until the employee scans his or her identification token a second time. The second scanning signifies that the authorized person is no longer operating the station. In this embodiment, enhanced significance is given to the scans of multiple items without requiring the authorized person to scan his or her identification before each item scan.

In yet another embodiment of the present invention, the authorized person may use a key to turn a switch to indicate an authorized person is operating the station and the data derived from subsequent scans is given enhanced significance. This mode of operation continues until the keyed switch is turned to the off position and the key removed. Another embodiment of the present invention enables authorized personnel to identify themselves through the keyboard of the terminal for the self-checkout station and enhanced significance of subsequent data continues until the authorized person logs off through the keyboard.

The system of the present invention may be implemented with a self-checkout terminal that includes a display, a bar code scanner, and a checkout scale, all of which are coupled to the processor for the terminal. The checkout scale may include a processor operated by programmed instructions with memory for collecting and analyzing weight data or it may provide the weight data to data peripheral interfaces for the terminal processor. The program memory of the terminal processor may include one or more program modules for storing a provisional weight and weight counter in a database in association with an item identifier. The program memory may also include a security application that uses the item weight data to track items in the checkout area. The display may be used to communicate with the consumer regarding movement of items in the checkout area.

The method of the present invention includes identifying store authorized personnel scanning an item and multiplying the contribution of a measured weight for the scanned item to a data value computation. Identification of store authorized personnel may occur through the scanning of an employee identification token, the turning of a key operated switch, or entry of an employee identification code through the keypad of the terminal of the self-checkout station. Additional employee identification schemes may include the verification of biometric data obtained from an employee such as a retinal pattern or fingerprint. The multiplication of the measured weight corresponding to a provisional weight value may be implemented by incrementing a provisional weight counter a number of times greater than the incrementing that takes place when a consumer scans and weighs an item. Alternatively, if the measured weights within a tolerance range about a provisional weight are stored in the database in association with the item identifier then multiple copies of the weight measured by an authorized person may be stored in the database. These multiple copies facilitate the accumulation of sufficient weight data for the computation of the provisional weight data that is used to update the weight data stored for an item identifier.

It is an object of the present invention to facilitate the accumulation of reliable data for the computation of weight data for updating a database for item identifiers.

It is an object of the present invention to more quickly collect the historical weight data required for computing an accurate weight for an item identifier.

These and other advantages and features of the present invention may be discerned from reviewing the accompanying drawings and the detailed description of the invention.

BRIEF DESCRIPTION OF THE DRAWINGS

The present invention may take form in various system and method components and arrangement of system and method components. The drawings are only for purposes of illustrating an exemplary embodiment and are not to be construed as limiting the invention.

DETAILED DESCRIPTION OF THE INVENTION

Figure 1:
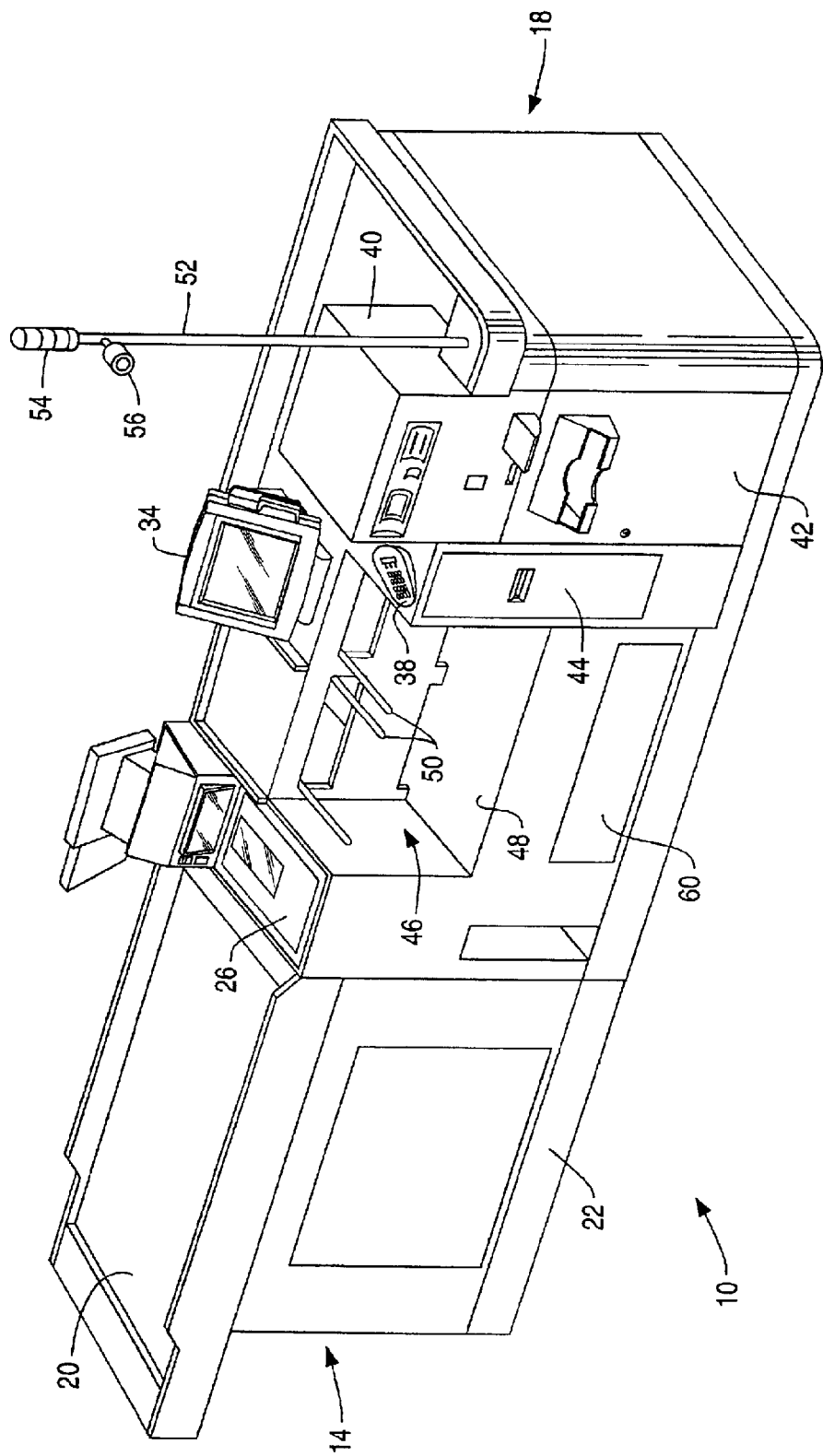
FIG. 1 depicts a block diagram of a self-checkout station in which the present invention may be used.

A self-checkout station used with the system and method of the present invention is shown in FIG. 1. Checkout station 10 may include a feeder unit 14 and a checkstand 18. Feeder unit 14 includes a feeder belt 20 and housing 22 for the motor and control circuitry that operates feeder belt 20.

Feeder unit 14 is movably coupled to checkstand 18 so the feeder belt may be aligned with scanner/scale unit 26. Checkstand 18 includes scanner/scale unit 26, consumer terminal 34, a payment terminal 38 for entry of payment data, and receipt printer 44. Scanner/scale unit 26 uses a laser shining on a glass or other transparent platen to input data from bar codes applied to products or packages. Unit 26 may also include a scale for measuring the weight of items that are sold on a price/unit of weight basis. Consumer terminal 34 displays item data as it is entered through scanner/scale unit 26. Payment terminal 38 may be any known POS terminal that incorporates a keypad and card reader to support credit card, to debit card, and other payment methods. Receipt printer 44 provides a consumer with a receipt itemizing the items purchased and the method of payment.

Separating receipt printer 44 and scanner/scale unit 26 is a bagwell 46, which has a floor that is adjoined to three upright walls. The floor of bagwell 46 may rest on scale 48. Consumers place scanned items in bags hanging from rails 50 in bagwell 46 so the items rest on the floor of bagwell 46 and scale 48. Security scale 48 compares item weight data derived from scanner/scale 26 for produce items or weight data retrieved from a database for items having a unit price code to the weight differential measured by scale 48 to verify that the item scanned is placed on scale 48. Security application programs operating within terminal 34 monitor security scale 48 to determine whether items not scanned have been added to the security scale area. An anomalous condition that requires investigation may be signaled by lighting a warning or alert light color within the tri-color indicator 54 mounted at the terminal end of indicator pole 52 of checkstand 18. Indicator pole 52 may also have mounted thereon a security camera 56 for providing a video signal to a security officer surveillance area or to some storage media. A database, disk drive, or other computer peripheral required for station operation may be housed within peripheral tray 60 located within checkstand 18. Checkstand 18 also includes currency acceptor 40 for receiving units of paper currency and coins from a consumer as payment for a transaction while cash dispenser 42 returns change to a consumer or funds requested from a debit account or the like.

As shown in FIG. 1, a consumer may place items on feeder belt 20 and belt 20 is driven to bring items to the end of belt 20 where a shut-off mechanism stops belt 20. The consumer may commence a transaction by removing items from belt 20 and moving them, one at a time, over scanner/scale 26 for item product data retrieval and/or weighing. The scanned items may then be placed in bags on security scale 48. Once all of the items are scanned, a consumer may provide payment through payment terminal 38 or currency acceptor 40, receive change from dispenser 42, and a receipt from printer 44. The consumer may then remove the bags from security scale 48 and leave station 10 to complete a transaction.

Figure 2:
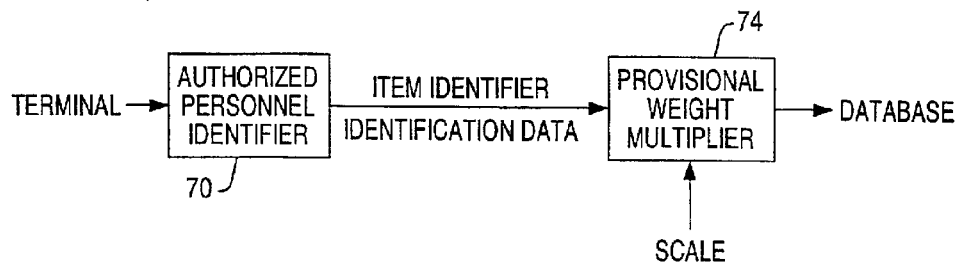
FIG. 2 is a block diagram of an exemplary embodiment of the components for collecting and weighting measured provisional weights for computation of new weight data for an item scanned at the station shown in FIG. 1.

In one embodiment of the present invention, an provisional weight data collection system may reside in the computer that controls terminal operation for the checkout stand or in the computer that controls operation of scale 48. The provisional weight data collection system 68 includes the components shown in the block diagram of FIG. 2. System 68 includes an authorized personnel identifier 70 and a provisional weight multiplier 74. Identifier 70 receives identification data that indicates that a store employee such as a self-checkout station attendant is operating station 10 and scanning items at scanner 26. The identification data may be received from scanner 26 as a store employee scans an identification token at scanner 26. Use of the identification data to query the database for item identifiers results in the retrieval of data indicating a store employee is operating station 10. This data may be stored in the database with the provisional weight data to identify the personnel who scanned items used in the computation of new weight data for an item identifier. This data may be used to reduce the likelihood of fraudulent item scanning by store personnel for the generation of erroneous weight data. Employee identification data may also be received through operation of a key switch (not shown), keypad 38, or a biometric data input device (not shown).

Once identifier 70 receives authorized person identification data and confirms the person's authorization by querying the database, provisional weight multiplier 74 evaluates the sensed or measured weight for the item last placed on scale 48. If the item identifier for the scanned item does not have a stored weight associated with it or if the sensed weight is not within the tolerance range about one of the weights stored in association with the item identifier, the sensed weight is a provisional weight. Provisional weight multiplier 74 verifies that the sensed provisional weight data is within the tolerance range about a provisional weight previously stored for the item identifier. If no provisional weight has been previously stored, the provisional weight is stored as a provisional weight for the item identifier and stored in the database in association with the item identifier. If a provisional weight has been previously stored and the sensed weight data is not within the toleration range of the stored provisional weight, provisional weight multiplier 74 determines whether the sensed weight corresponds to a previously stored weight for the item identifier. If it does, the item is confirmed as a purchased item but no action is taken regarding the computation of the provisional weight for the item identifier. Such action may occur when an outside disturbance is affecting the accuracy of the weight reading. For example, a downdraft of forced air on the scale may alter the reading and the draft may terminate during the employee's operation of station 10. If the sensed weight does not correspond to a previously stored weight or a current provisional weight, weight multiplier 74 accepts the sensed weight as another alternative provisional weight that is stored in the database in association with the item identifier. In the event that weight multiplier 74 determines that the sensed weight corresponds to a current provisional weight or is an alternative provisional weight, multiplier 74 may increment the weight counter for the corresponding provisional weight. The counter is incremented by a number that is greater than the number used to increment the counter when a consumer scans an item and the sensed weight corresponds to a provisional weight for the item's identifier. Alternatively, weight multiplier 74 may store multiple copies of the sensed weight in a list of historical weights being accumulated for computation of a new weight value for the item identifier. Either operation of weight multiplier 74 causes number of entries required for computation of new weight data or the counter value required for confirmation of a provisional weight as new weight data to be reached more quickly. The facilitation of weight data collection by weight multiplier 74 is reliable because an authorized person has operated station 10 during the collection of the provisional weight data.

In one embodiment, weight multiplier 74 continues to evaluate sensed weight data for multiplication of its use in the computation of new weight data for an item until the employee signals that he or she is no longer operating station 10. The signal may be generated by another scan of the employee's identication token, removal of the key from the key operated switch, entry of an exit code through keypad 38, or entry of the employee's biometric data. Alternatively, weight multiplier 74 may only perform the evaluation of the sensed weight data for a single item after entry of the employee identification data.

Figure 3A:
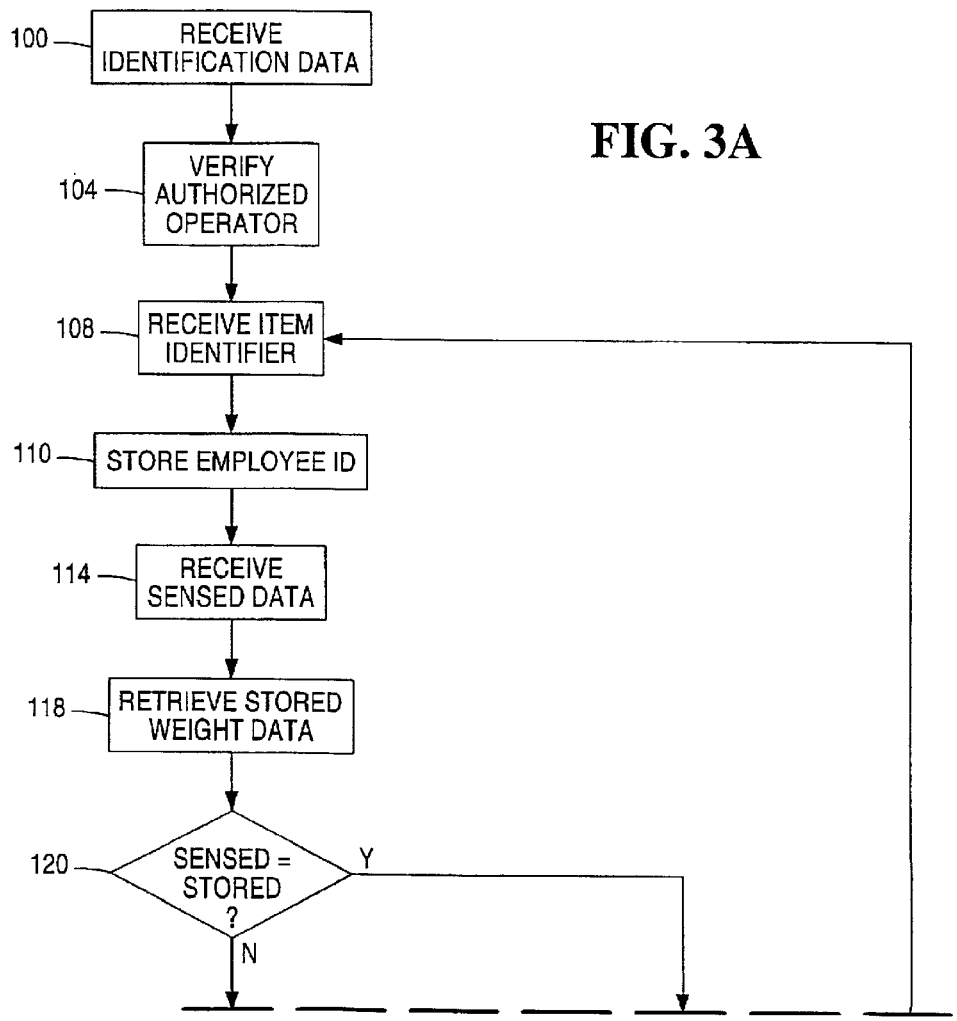
FIGS. 3A and 3B (hereinafter collectively referred to as "FIG. 3) is a flowchart of an exemplary method for collecting and weighting provisional weights for the computation of new weight for items scanned by the station shown in FIG. 1.
Figure 3B:
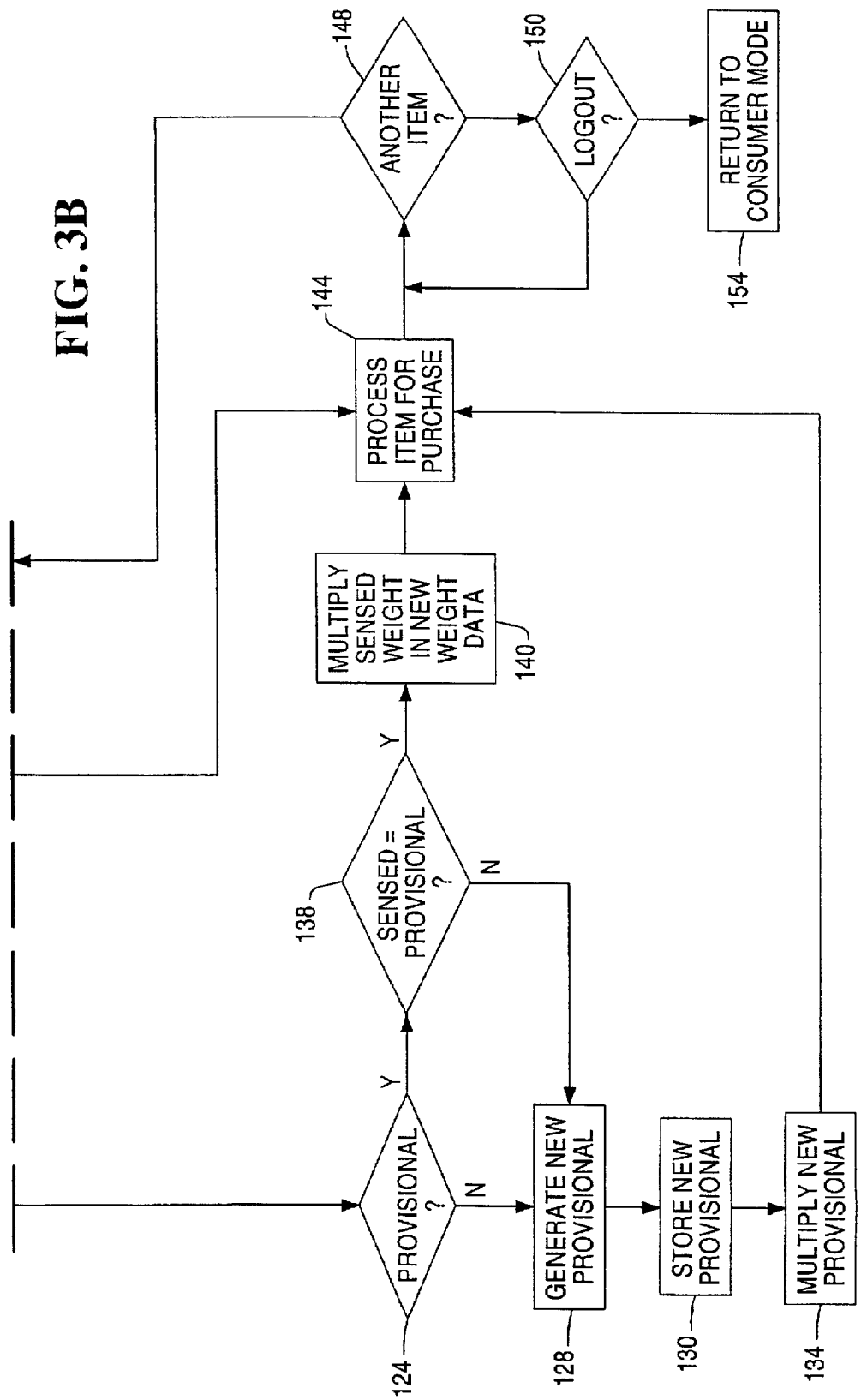

An exemplary process that may be implemented by identifier 70 and weight multiplier 74 in accordance with the principles of the present invention is shown in FIG. 3. The process receives authorized personnel identification data (block 100) and verifies the person's authorization (block 104). The identification data may be entered through scanner 26, keypad 38, or a biometric data input device. Verification may be performed through the querying of a database or through the operation of a key switch for which only authorized personnel should possess a key. Upon the scan of a item by the employee, an item identifier is received (block 108) and, preferably, the employee's identification code is stored in the database in association with the item identifier for the scanned item (block 110). This association may be used to later identify the employees who scanned items for processing of a provisional item weight.

The weight reading from scale 48 for the scanned item is received (block 114) and approved weights for the item identifier, if available from the database, are retrieved (block 118). If the sensed weight reading corresponds to one of the retrieved weights (block 120) then the item is processed for purchase (block 144). The process continues by determining whether another item has been scanned for processing (block 148). If not, the process determines whether the authorized person has logged off the station (block 150). The process continues checking for an item scan (block 148) or employee logoff (block 150) until one of the events occurs. If the employee logs off, station 10 returns to the consumer mode of operation (block 154).

If the sensed weight does not correspond to an approved weight, the database is searched for a provisional weight associated with the item identifier (block 124). If there is no provisional weight, then a new provisional weight is generated for the item identifier from the sensed weight (block 128) and stored in association with the item identifier (block 130). The contribution of the new provisional weight is multiplied (block 134). This multiplication may be the initialization of a provisional weight counter at a value that is greater than the initialization value of the counter when a sensed weight for an item scanned by a consumer is used to generate a provisional weight. For example, a sensed weight for a consumer scanned item may result in a counter initialization at the value of one while an employee scanned item may result in a counter initialization of two, three, or even greater. Alternatively, the process may store multiple copies of the sensed weight in a histogram maintained for a new weight computation. After processing for the new provisional weight is completed, the scanned item is processed for purchase (block 144) and the process continues as previously described.

If one or more provisional weights are stored in association with the item identifier, the sensed weight is compared to the provisional weights to determine whether it is within a tolerance range about the provisional weights (block 138). If it is not, the sensed weight is processed as an alternative provisional weight for the item identifier (blocks 128–134). If the sensed weight corresponds to a provisional weight, then the sensed weight is multiplied for a new weight computation by incrementing the provisional weight counter or by storing multiple copies of the sensed weight in association with the item identifier (block 140). The item is then processed for purchase (block 144) and the process checks for another scanned item to process (block 148) or the logout of the employee (block 150). When the employee logs off, station 10 returns to consumer operational mode (block 154).

The system and method of the present invention may be implemented by adding functionality to an existing self-checkout terminal. That is, hardware and software may be added to existing checkout station processors, such as the processor terminal 34, scale 48, or a combination thereof to implement the components of system 68 or the exemplary method described above. The system and method of the present invention facilitate the collection of reliable data for computation of new weight data for an item identifier as well as reducing the number of weight readings required for the computation.

While the present invention has been illustrated by the description of exemplary process and system components, and while the various processes and components have been described in considerable detail, it is not the invention of the application to restrict or in any limit the scope of the appended claims to such details. Additional advantages and modifications will also readily appear to those skilled in the art. The invention in its broadest aspects is therefor not limited to specific details, implementations, or illustrative examples shown and described. Accordingly, departures may be made from such details without departing from the spirit or scope of applicant's general inventive concept.

What is claimed is:

1. A system for multiplying the contribution of provisional weight data for items scanned by authorized personnel to the computation of a new weight comprising:
    an authorized personnel identifier for identifying authorized personnel scanning an item; and
    a provisional weight multiplier operatively coupled to the authorized personnel identifier for multiplying a contribution of a sensed weight for the scanned item to a new weight computation for the scanned item.

2. The system of claim 1 wherein the authorized personnel identifier identifies authorized personnel from identification data received from one of a scanned identification token.

3. The system of claim 2 wherein the authorized personnel identifier confirms authorization of the identified person through a database query.

4. The system of claim 1 wherein the authorized personnel identifier identifies authorized personnel from identification data received from a keypad.

5. The system of claim 4 wherein the authorized personnel identifier confirms authorization of the identified person through operation of a key switch.

6. The system of claim 1 wherein the authorized personnel identifier identifies authorized personnel from biometric data.

7. The system of claim 1 wherein the provisional weight multiplier increments a provisional weight counter by a number greater than a number used to increment the provisional weight counter in response to an item scanned by a consumer.

8. The system of claim 1 wherein the provisional weight multiplier stores multiple copies of a sensed weight associated with an item verifier for the scanned item.

9. The system of claim 1 wherein the provisional weight multiplier generates a provisional weight associated with an item identifier for the scanned item in response to no provisional weight being associated with the item identifier.

10. The system of claim 1 wherein the provisional weight multiplier generates an alternative provisional weight associated with an item identifier for the scanned item in response to the sensed weight not corresponding to another provisional weight associated with the item identifier.

11. The system of claim 10 wherein the provisional weight multiplier initializes a provisional counter for the alternative provisional weight and the initialization value is greater than an initialization value used to initialize a provisional counter an item identifier for an item scanned by a consumer.

12. A method for multiplying the contribution of provisional weight data for items scanned by authorized personnel to the computation of a new weight comprising:

identifying authorized personnel scanning an item; and multiplying a contribution of a sensed weight for the scanned item to a new weight computation for the scanned item.

13. The method of claim 12 wherein the authorized personnel identification includes receiving identification data from a scanned identification token.

14. The method of claim 12 wherein the authorized personnel identification includes receiving identification data from a keypad.

15. The method of claim 12 wherein the authorized personnel identification includes receiving biometric identification data.

16. The method of claim 12 wherein the authorized personnel identification includes confirming authorization of the identified personnel through a database query.

17. The method of claim 12 wherein the authorized personnel identification includes confirming authorization of the identified personnel through operation of a key switch.

18. The method of claim 12 wherein the multiplied weight contribution includes incrementing a provisional weight counter by a number greater than a number used to increment the provisional weight counter in response to an item scanned by a consumer.

19. The method of claim 12 wherein the multiplied weight contribution includes storing multiple copies of a sensed weight associated with an item verifier for the scanned item.

20. The method of claim 12 further comprising:

generating a new provisional weight associated with an item identifier for the scanned item in response to no provisional weight being associated with the item identifier.

21. The method of claim 12 further comprising:

generating an alternative provisional weight associated with an item identifier for the scanned item in response to the sensed weight not corresponding to another provisional weight associated with the item identifier.

22. The method of claim 21 further comprising:

initializing a provisional counter for the alternative provisional weight and the initialization value is greater than an initialization value used to initialize a provisional counter an item identifier for an item scanned by a consumer.

* * * * *